United States Patent [19]

Jeromson, Jr. et al.

[11] Patent Number: 5,007,313

[45] Date of Patent: Apr. 16, 1991

[54] PLIERS

[75] Inventors: James R. Jeromson, Jr., Aurora; J. Edward C. Anderson, Moreland Hills, both of Ohio

[73] Assignee: Milbar Corporation, Chagrin Falls, Ohio

[21] Appl. No.: 378,448

[22] Filed: Jul. 10, 1989

Related U.S. Application Data

[63] Continuation of Ser. No. 182,016, Apr. 29, 1988, abandoned, which is a continuation-in-part of Ser. No. 46,851, May 7, 1987, abandoned.

[51] Int. Cl.[5] .................... B23P 19/04

[52] U.S. Cl. .................... 81/486; 81/485; 81/302; 29/229

[58] Field of Search .................... 81/485, 486, 302, 416, 81/417; 29/229, 225

[56] References Cited

U.S. PATENT DOCUMENTS 3,662,449 5/1972 Hashimoto .................... 29/229
3,762,019 10/1973 Epstein .
3,990,137 11/1976 Kulba et al. .................... 81/302 X
4,476,750 7/1981 Murphy .

FOREIGN PATENT DOCUMENTS 2364509 4/1974 Fed. Rep. of Germany .
1334877 10/1973 United Kingdom .

*Primary Examiner*—D. S. Meislin
*Attorney, Agent, or Firm*—Watts, Hoffmann, Fisher & Heinke

[57] ABSTRACT

A hand tool including a pair of levers each including a handle portion, a jaw portion and a boss portion interconnecting the handle and jaw portions, with the levers being pivotally interconnected for normally permanently intended but relatively movable relationship. The lever sections are pivotally interconnected together along the boss portions for manipulation between internal and external tool operating positions. Movement between the internal and external positions is provided by work position selection structure positioned on the levers, and including guiding and stopping structure for selectively moving the tool between operating positions and stopping tool movement in the proper operating position.

27 Claims, 4 Drawing Sheets

FIG. 11
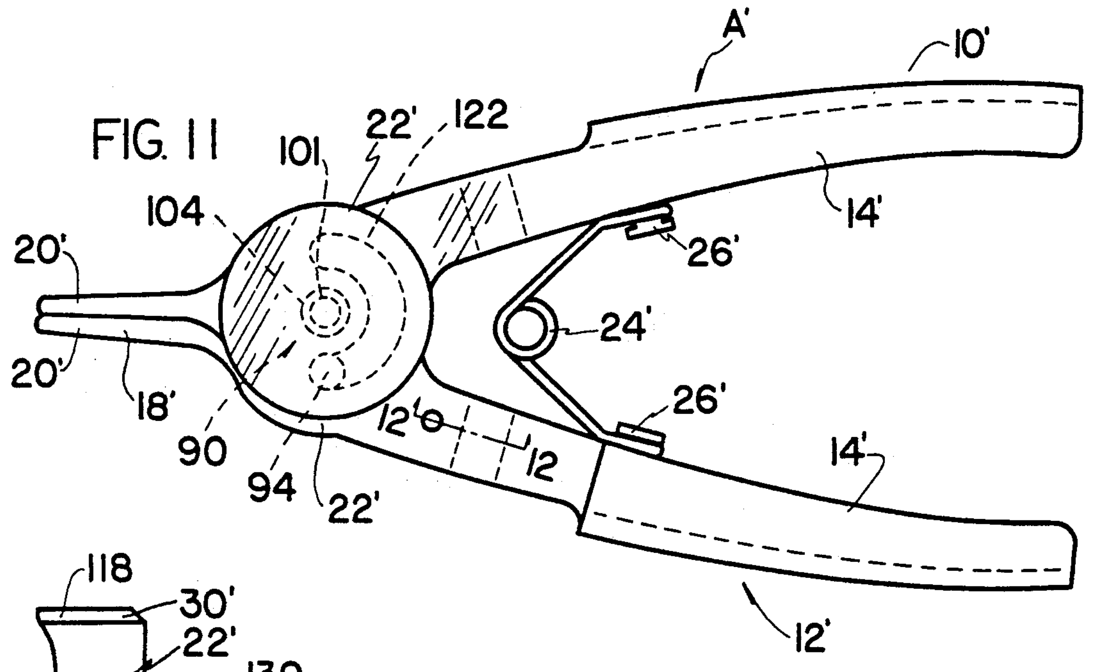
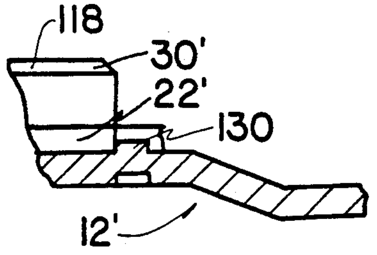
FIG. 12
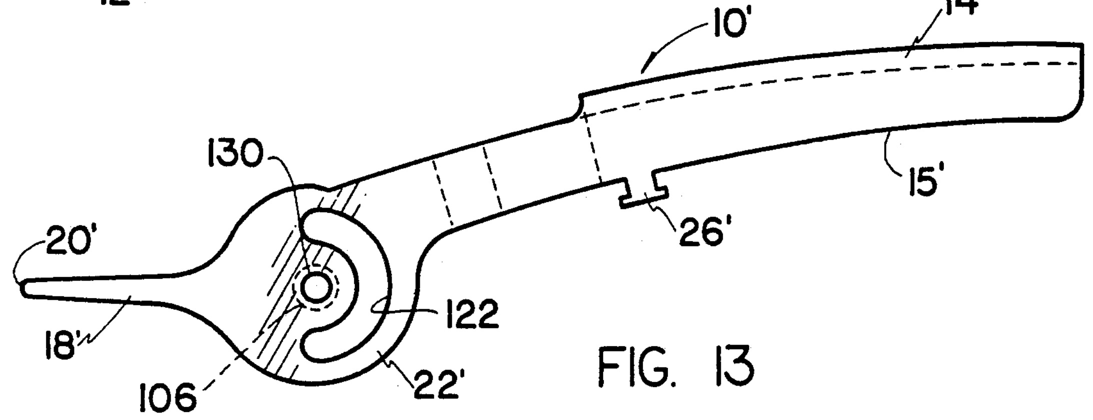
FIG. 13
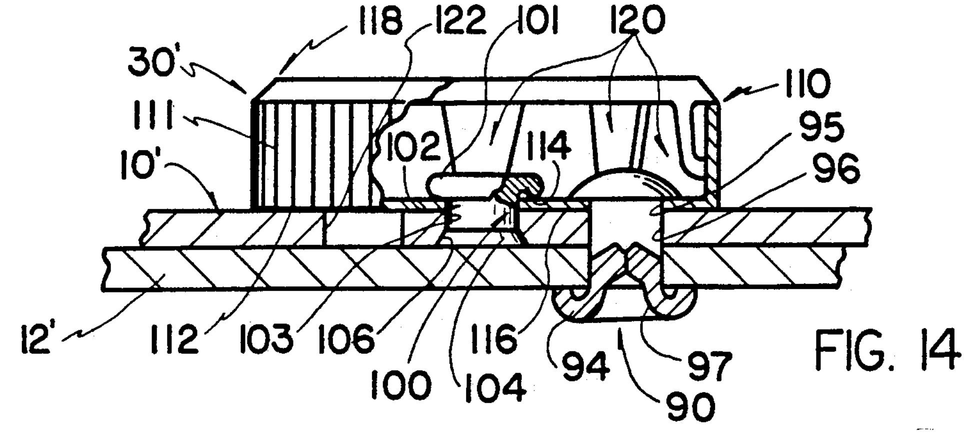
FIG. 14

PLIERS

This is a continuation of co-pending application Ser. No. 07/182,016 filed on 4/29/88, which is a continuation in part of Ser. No. 07/046,851 filed on May 7, 1987, both now abandoned.

TECHNICAL FIELD

This invention relates to a hand tool of the type used for expansion and/or contraction of differing types of deformable members.

BACKGROUND ART

Snap or retaining rings are either "internal" or "external". The internal type of retaining ring is used to retain elements such as bearings or shafts, within a bore. In order to install the ring it is contracted to allow it to pass into the bore, and then allowed to expand for engagement with an internal groove formed around the bore. The external type of retaining ring is used to retain elements such as bearings, gears or pulleys on shafts. An external ring normally engages an annular groove formed in a shaft to inhibit axial movement of an element mounted on the shaft. An external ring is generally installed by expanding the ring until its internal diameter is greater than the shaft diameter.

The tools typically used for installing and removing internal and external rings are substantially different. A tool for installing and removing external rings, for example, must expand the ring to increase its internal diameter in order to accommodate the shaft. An internal ring installation and removal tool, however, must contract the ring in order to decrease its external diameter to enable the ring to pass through a bore. Since the function and performance required of such tools is so substantially different, retaining ring pliers are often supplied as single purpose "internal" and "external" tools. These single purpose pliers are intended for use only in installing or removing one type of retaining ring, and both types of pliers are therefore required in order to install or remove both external and internal types of retaining rings.

One solution to the provision of a tool suitable for either internal or external rings has been the provision of convertible tools capable of switching between internal and external positions. These required manipulation of interconnected pieces, movement of a linkage arrangement mounted on the tool or disassembly of jaw and/or handle sections in order to accomplish the conversion.

One such convertible tool, known as a universal plier, is illustrated in U.S. Pat. No. 4,625,379. The tool includes a pair of pivotally interconnected handles and a pair of jaw members coupled to the handles by a latching mechanism having two transversely slidable latch members. In one position, the latch members are positioned to allow one handle member to be coupled to one jaw member and the other handle to be coupled to the other jaw member. Upon transversely sliding the latch members to a second position, the one handle is coupled to the other jaw member and the other handle is coupled to the one jaw member. While the construction of the referenced patent has enjoyed great success, it is relatively complex and it contains numerous parts which must be properly assembled and aligned during operation to provide proper functioning. In a substantially different construction, a plier is provided whereby separate pairs of jaws and handles are pivotally interconnected about a common axis and are arranged such that a pair of movable pins is adapted to alternately engage the jaw and handle pairs to shift the jaw and handle interconnections from an internal position to an external position and visa versa.

An additional form of plier construction provides interconnected levers having two jaw members for simultaneous operation of the tool on internal and external retaining rings by a pair of jaws positioned for internal operation and a pair of jaws for external operation.

Another convertible plier construction utilizes linkages that must be disengaged and the tool reassembled in order to change the relationship between the handles and jaws. Such a construction is cumbersome to use as it requires unneeded preparation time prior to use, and may alter the configuration of the tool such that it becomes uncomfortable to use. In addition at least some such tools have significantly different mechanical advantages in the internal and external positions.

A proposed tool provided handles which were intended to be relatively moveable between internal and external positions. To accomplish this one lever included a U-shaped slot and the other carried a pivot which projected through the slot. Presumably the levers can be moved from a crossed internal ring relationship with the pivot at one end of the slot to a side by side external ring relationship. If the proposed tool was operable at all, it lacked structure to maintain the levers in a selected relationship when in use.

SUMMARY OF INVENTION

The present invention provides a new and improved hand tool for removing and installing internal and external retaining rings. The tool includes two levers permanently connected together which nonetheless may be easily switched between internal and external operating positions. In each embodiment reaction forces resulting from a work operation apply a position retention force to maintain the levers in a selected relationship while a work operation is performed.

In the original preferred embodiment, the tool comprises right and left operating lever sections pivotally interconnected together with driving structure for shifting the lever sections between tool operating positions. Each of the lever sections includes a jaw portion, a handle portion and a boss portion intermediate the jaw and handle portions. The pivotal interconnection of the lever sections is perpendicular to and intersects an imaginary center line which bisects the tool.

The interconnection of the lever sections and position of the jaw and handle portions of the lever sections is configured in a side by side relationship during operation of the tool in the external position. Thus, both the jaw and handle portions of the one lever section operate on one side of the center line, while the jaw and handle portions of the other lever are on the other side of the center line. When in the internal operating position, the portions are crossed such that the jaw and handle portions of the one lever operate on opposite sides of the center line, and the jaw and handle portions of the other lever are also opposite one another relative to the center line.

In the originally preferred construction, one lever section and the driving structure, which comprises a driving knob, are coupled together so that the other lever section moves relative to the one lever section and driving knob. As a result of this construction, when the tool is in the external position, the lever sections are crossed. When the driving knob is manually rotated to shift the levers for operation in the internal position, the lever sections move to opposite sides of the center line in side by side relationship.

Because the tool is configured to provide a movable relationship between the lever sections for internal and external positioning, there is no requirement that discrete handle members and jaw members be selectively interconnected for being reversibly coupled to one another. The present invention instead provides that the levers are shiftable between positions.

In the originally preferred embodiment, a driving knob couples the levers. The knob includes a handle portion, a lever engagement portion and a base portion disposed in a circular recess in one of the levers. A pivot connects that base portion to the other lever in eccentric relationship. The base portion includes an arcuate groove which is coaxial with the base portion. The other lever includes a projection which extends into the groove in a work position orientation relationship. To move the tool between external and internal positions, the handle portion of the knob is manually rotated to cause eccentric relative lever movement including a longitudinal component so that one jaw tip passes over the other. As the knob is rotated, the projection travels within the knob groove following the arcuate path of the groove over an arc of 180° or more. The levers move from one of internal and external positions to the other arriving in the other position upon the projection reaching the other end of the path. Upon contacting the end of the groove, the guiding portion acts as a stop member which stops rotation of the tool in the proper operating position.

In a similar alternate and now preferred construction of the hand tool invention, one lever section is coupled with a driving knob at a driving connection. The other lever section is moveable relative to the one lever section and knob. The driving knob is used as in the originally preferred embodiment, in that manual rotation of the knob shifts the lever sections between an external position to opposite sides of the center line in their side by side relationship and a crossed internal ring relationship.

The driving knob of the now preferred embodiment comprises a drawn cup-shaped member having an annular side wall, a bottom portion supporting the knob on the one lever section, and a cap member engaged with the annular wall and supported within the cup member. A pivot connection secures the knob and lever sections together in eccentric relationship.

The one lever section includes an arcuate groove for engagement with the driving connection in a work position establishing relationship, and a recessed aperture for engagement with the driving connection in a flush working relationship with respect to the other lever section. Movement of the knob results in eccentric relative lever movement so that one jaw tip passes over the other. As the knob is rotated, the driving connection travels within the lever groove following the arcuate path of the groove over an arc of 180° or more. The levers thus move from one position, and arrive at the other position when the driving connection reaches the other end of the arcuate path. Upon contacting the other end of the groove, the driving connection serves as a stop member for stopping rotation of the tool in the proper operating position.

In a third embodiment, the tool driving structure comprises a crescent shaped slot located in the boss portion of one lever. A pivot is connected to the other lever and extends through the slot. The slot is preferably configured to include two stop locations, where, upon movement of the lever section to one stop location or the other, the tool is positioned in either the internal or external operating modes. The pivot interconnecting the lever sections is engaged through the slot and is engaged along one or the other of the stop locations.

When the tool of either of the embodiments is in use, reaction forces maintain the tool in at least one of its adjusted positions. With the FIG. 1–10 embodiment, since, the arcuate groove is in excess of 180° in length, the projection passes over center and the reaction forces urge the projection against the appropriate end of the groove when in its external ring position. With the other embodiment the pivot is forced against surfaces of the appropriate one of the stop locations in both positions.

The tool of the preferred embodiment of the present invention preferably includes a spring interposed between the lever handle portions for biasing the handles away from one another.

Use of the spring results in the handle portions often being biased to their farthest positions. As the farthest handle positions makes it difficult to conveniently store the tool, a locking device is also provided. The device includes a locking lever arm pivotally mounted on the handle portion of the one lever section. The lever arm is positioned to lockingly engage a notched portion in the boss portion of the other lever section. The notched portion is configured to engage and maintain the lever arm whereby the tool remains in the locked and closed position against the bias of the spring.

In the new and now preferred construction, a raised stop limit on the other lever section is also used to limit the farthest handle position when the tool is in the internal position. The stop limit engages the boss portion of the one lever section to prevent handle movement past a maximum open position.

These and other features and advantages of the present invention will be had by referring to the following description and claims taken in conjunction with in the accompanying drawings.

BRIEF DESCRIPTION OF THE DRAWINGS

FIG. 11 is a plan view of a now preferred embodiment of the plier tool of the present invention in the external closed position;

FIG. 12 is a partial sectional view of an internal-open position stop limit taken along the line 12—12 of FIG. 11;

FIG. 13 is a plan view of the one lever of the plier tool of FIG. 11;

FIG. 14 is an enlarged partial sectional view of the driving structure of the plier tool of FIG. 11;

BEST MODE FOR CARRYING OUT THE INVENTION

Figure 1:
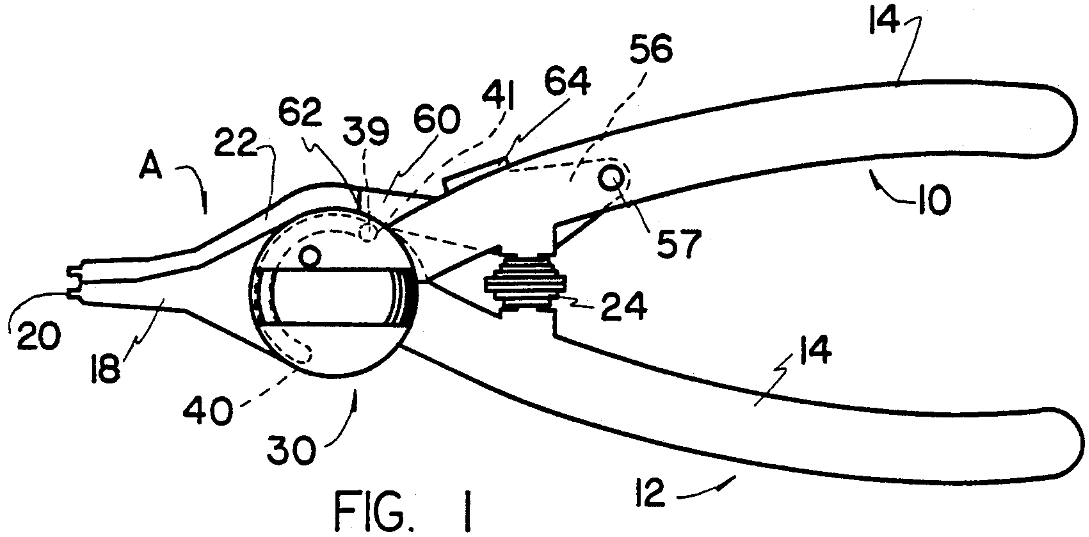
FIG. 1 is a plan view of the plier tool of the present invention in the internal and closed position with the locking mechanism in the locked position.

Three embodiments of the plier tool of the present invention for expanding or contracting retaining members are shown in FIGS. 1-10, FIGS. 11-14 and in FIGS. 15-20, respectively. Parts described in connection with the second and third embodiment that are identical to those of the first have been identified with the same reference numeral, but with a prime or double prime designation, and will not be separately described except to the extent required for clarity.

With reference to FIGS. 1-10, the first embodiment of the plier tool according to the present invention, a hand tool A is adapted for expanding or contracting resilient members in an internal or external mode of operation. In the illustrated embodiment, the tool A includes a pair of lever sections 10, 12 each having a handle portion 14, covered by plastic grip covers 15, as in FIG. 10. The lever sections are pivotally interconnected for normally permanent but relatively movable action about a pivot pin in the form of a threaded fastener 16.

Figure 2:
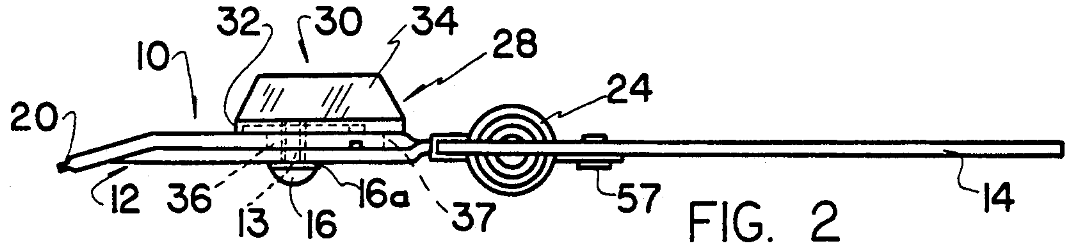
FIG. 2 is a side elevational view of the plier tool shown in FIG. 1.
Figure 3:
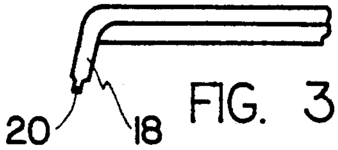
FIG. 3 is a partial view of an alternate configuration of the tool tip of the present invention.
Figure 10:
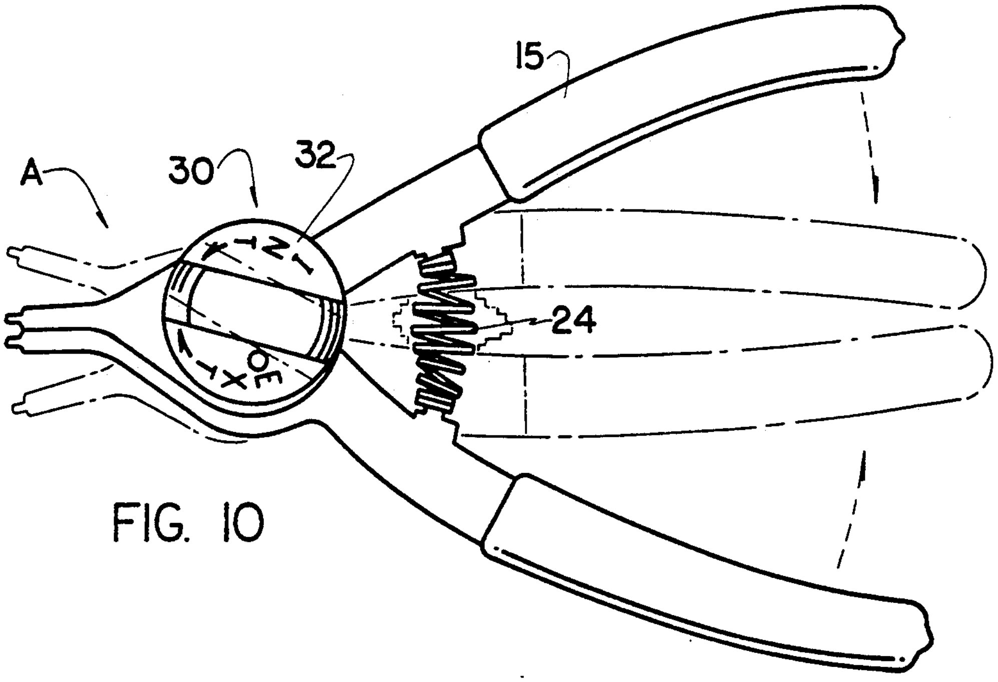
FIG. 10 is a plan view of the plier tool embodying the present invention shown in solid lines in the external closed and in phantom in external open positions.

In addition to the handle portions 14, each lever section 10, 12 includes a jaw portion 18 having a forwardly projecting tip 20, and a boss portion 22. As shown in FIGS. 2 and 3, both tips 20 are integral with the lever section, but removable tips may be provided. The boss portion 22 is positioned intermediate the handle and jaw portions 14, 18. The lever sections 10, 12 are interconnected through their respective boss portions 22 by the pivot pin 16. The tool A is manipulated between operating modes by a shifting or driving structure 28 which permits movement of the lever sections 10, 12 between the external position, when the lever sections are in a side by side relationship, FIG. 10, and the internal position, in which the lever sections are in a crossed relationship, FIGS. 1, 6. When the tool is in the external position as shown in FIG. 10, the lever sections 10, 12 and their associated tips 20 are positioned next to one another. Squeezing the handle portions 14 causes the jaw portions 18 and tips 20 to separate and assume the open position as indicated by the phantom line tool view. The outward movement of the tips 20 to this position enables the jaw portions 18 to expand an external retaining ring.

Figure 6:
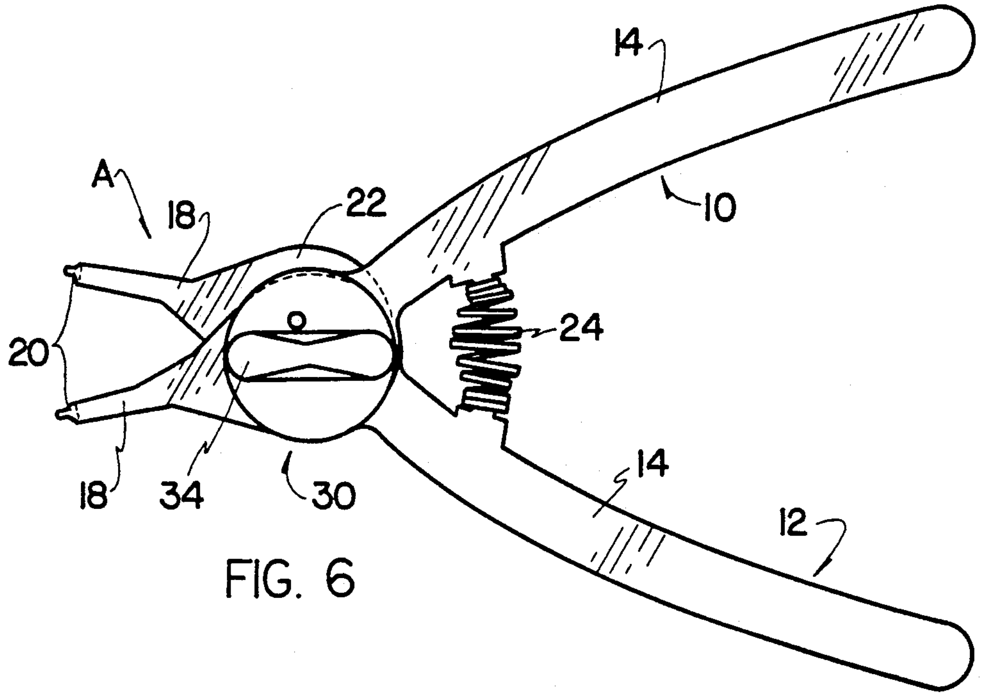
FIG. 6 is a plan view of the plier tool of the present invention shown in the internal open position.

By manipulating the shifting or driving structure 28, the tool A is selectively moved to the internal mode of operation as shown in FIGS. 1 and 6. The tool illustrated in FIG. 6 is described as being in the open position. In this position, the handles are released or biased by the spring 24, and the jaw portions and their associated tips are located away from one another. When the handle portions 14 are squeezed towards one another, the jaw portions 18 and their associated tips 20 are moved towards one another to the closed position as shown in FIG. 1.

Figure 7:
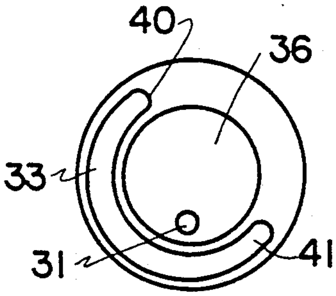
FIG. 7 is a plan view of the operating knob of the plier tool of the present invention on an enlarged scale.
Figure 8:
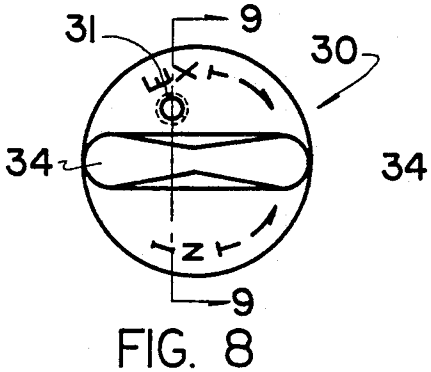
FIG. 8 is a bottom view of the operating knob of FIG. 7.
Figure 9:
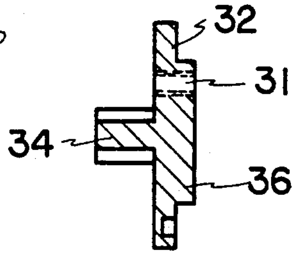
FIG. 9 is a cross-sectional view of the operating knob of FIG. 7 as seen from the plane indicated by the line 9—9 of FIG. 8.

Movement of the tool between these modes of operation is provided by the shifting or driving structure 28. In the embodiment of the tool shown in FIGS. 1-10, the shift permitting structure includes a driving knob 30. The driving knob 30, as shown in FIGS. 7-9, includes a base portion 32, a handle portion 34 and an engagement portion 36.

The engagement portion 36 has a cylindrical surface sized for interacting engagement with walls defining a circular recess or driving aperture 37 in one lever section. The pivot 16 is interconnected with the knob base portion 32 to couple the knob 30 to the lever section 12 through a knob attachment aperture 31. The lever attachment aperture 13, through which the pivot pin projects, is offset such that the lever and knob 30 are connected in an eccentric relationship. The position of the attachment apertures, and thus of the pivot 16, is preferably based on correct tip 22 alignment, and is obtained by appropriately sizing the radius of the engagement portion 36 and interconnecting circular recess 37.

As illustrated, in FIG. 2 a spring washer 16A is positioned intermediate ahead of the pivot pin 16 and the boss portion 22 of the lever section 12 to provide stability to the tool, and also provide friction forces which prevent the knob 30 from unintentionally rotating with respect to the lever section. The distance the engagement portion projects into the aperture 37 is substantially less than or equal to the width of the lever section 10. The height of the engagement portion is necessarily limited so as to avoid interference with the lever section 12 which abuts the lever section 10 as shown in FIG. 2.

In the external position, reaction forces resulting from working operation of the tool, apply a position retention force maintaining the tool levers in the selected position during operation. In the internal position, a hand force and an internal retaining ring force operating on the tool result in a reaction force which biases the knob in a direction out of its proper operating position. Frictional retention forces provided by the spring washer 16A act against the reaction force to retain the knob and levers in their proper operating position.

Figure 4:
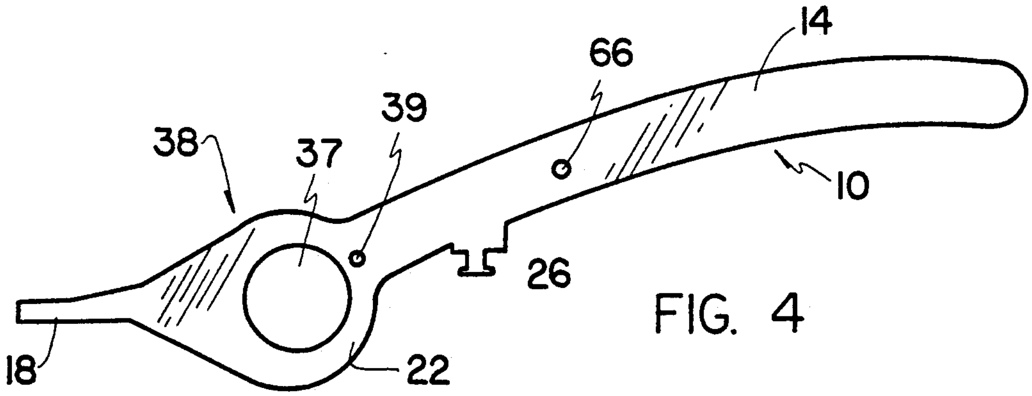
FIG. 4 is a plan view of the one lever of the plier tool of FIG. 1.
Figure 5:
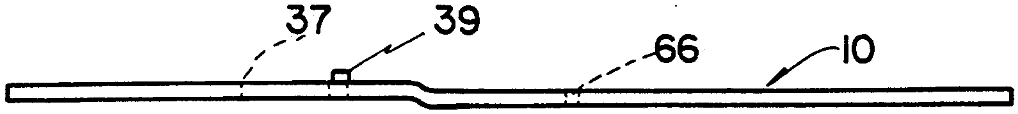
FIG. 5 is a side elevational view of the lever shown in FIG. 4.

Rotation of the lever sections 10, 12 is limited by guiding engagement structure 39 on the boss portion 22 of lever section 10. The guiding engagement structure 39 limits lever rotation through operating engagement with an arcuate groove 33 in the base portion 32 of the knob 30. As shown in FIGS. 4 and 5, the guiding engagement structure 39 comprises a guide post projecting from the boss portion of lever section 10. During manipulation of the tool between internal and external positions, the guide post is positioned within the arcuate groove 33. Relative movement of the guide post 39 within the groove 33 is permitted, since the height and diameter of the guide post are proportionate to the depth and width of the arcuate groove 33. By selectively rotating the handle portion of the knob 30, the lever section 12 moves in eccentric relation, with the guide post moving within the arcuate groove 33 until the tool is positioned in internal and external operating modes when the guide post engages the ends 40, 41 of the groove 33. The guide post 39 performs as a stop member which stops rotation of the tool in the internal or external operating position upon reaching the end of the groove corresponding to the selected position. The tool is in the internal position when the post 39 contacts the end of the groove 41, as shown in FIG. 1, and is in the external position when the post 39 contacts groove end 40.

The radius of the arcuate groove 33 is transverse to the central axis of the knob and extends, as shown in FIG. 7, more than 180° about the perimeter of the base portion 32. By extending the groove 33 in excess of 180° about the base portion 32, eccentric movement of lever section 12 is permitted between the crossed relationship in the internal position, and the side by side relationship in the external position, whereby the jaw portion and tip of lever section 12 pass under the jaw and tip of lever section 10 without interference. Knob rotation of more than 180° is preferable in order to obtain a path of non-interfering travel between tips 20 having degrees of angulation of the type shown on the tool in FIG. 2. Correct pivot position is maintained with the enlarged degree of knob rotation, by moving the pivot point radially outwardly.

Referring to FIGS. 11 to 14, an alternate and now preferred embodiment of the hand tool A′ is illustrated. As the tool A′ contains elements which are identical to the hand tool embodiment of FIGS. 1–10, common elements will be referred to using a prime designation. The hand tool A′ illustrated in FIG. 11 includes a pair of lever sections 10′, 12′ each having a handle portion 14′, covered by plastic grip covers 15′. The lever sections are pivotally interconnected about a driving pin or connection 90, which couples the lever sections 10′, 12′ and a driving knob 30′.

The driving connection 90 is in the form of a rivet joint 94. Jaw portions 18′ having tips 20′, and boss portions 22′, are also included as in the prior embodiment. The knob 30′ and lever sections 10′, 12′ are connected by the rivet joint 94 through respective aligned apertures 95, 96, and 97.

The tool A′ is manipulated between positions by rotation of the driving knob 30′. The lever sections move between internal and external positions in their side-by side relationship as described with respect to the above embodiment. Movement between positions is provided by a driving structure 28′ which includes a pivot connection 100 and the driving connection 90. The pivot connection 100 interconnects the one lever section 10′ with the driving knob 30′ so that the other lever section 12′ moves relative to the one lever section and knob.

The pivot and driving connections 100, 90, are best illustrated in FIG. 14. The pivot connection 100 includes a rivet 101 which engages the knob 30 and one lever section 10′ through respective aligned apertures 102, 103. Both the driving and pivot connection rivets 94 and 101, may include spring washers (not illustrated) similar to that shown in FIG. 2 for providing stability to the tool, preventing unintentional tool movement, and maintaining the tool in the selected operating position. The rivet 101 includes a countersunk head portion 104 for engagement with a recessed portion 106 of the aperture 103 in the one lever section 10′, so that the one lever section 10′ and pivot connection 100 are flush with respect to the one lever section 10′, as shown in FIG. 14, to avoid interference with the lever section 12′ which abuts the one lever section and rivet 101.

The driving knob 30′ of this embodiment comprises a drawn cup-shaped member having an annular side wall 110 with an outer knurled finger-engaging surface 111, a bottom portion 112 with an inner surface 114 and an outer surface 116 for engaging the one lever section 10′. The driving knob 30′ also includes a cap member 118 having a plurality of finger-like portions 120 for engaging with the annular side wall 110 to support and secure the cap member 118 within the cup member.

The one lever section 10′ further includes an arcuate groove 122 for engagement with the driving connection 90 in a work position establishing relationship. Movement of the tool between positions is thus provided by manual rotation of the knob which moves the driving connection along the groove 122 over an arc of 180° or more. By grasping the knob on the knurled surface 111 and selectively rotating the knob, the other lever section 12′ moves in eccentric relation with respect to the interconnected knob 30′ and one lever section 10′. The levers 10′, 12′ thus move from one position, and arrive at the other position when the driving connection reaches the other end of the groove. Upon contacting the other end of the groove, the rivet 94 serves as a stop member for stopping rotation of the tool in the selected operating position.

Referring to FIGS. 15–20, an alternate embodiment of the present invention is shown. The tool B is identical in all respects to the embodiments of FIGS. 1–10 and 11–14, except that a different shifting or driving structure 28″ is provided in the form of a crescent shaped slot 50 in the one lever section 10″. Since the embodiment of hand tool B contains structure similar to the embodiments previously described, reference numerals having a double prime designation will be used.

Figure 20:
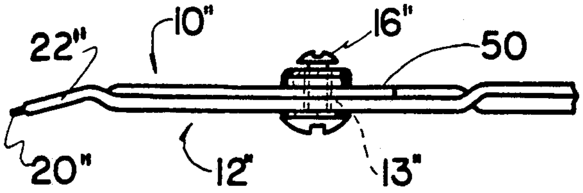
FIG. 20 is a side elevational view as seen from the plane indicated by the line 20—20 of FIG. 17.

The lever sections 10″, 12″ are pivotally interconnected for normally permanent but relatively movable action about a pivot pin or threaded fastener 16″. The slot 50 preferably includes stop locations 52, 53, where, upon movement of the lever sections such that the fastener 16″ is engaged along one stop location, the tool is positioned in one operating position. Interconnection of the lever sections 10″, 12″ by the pivot pin 16″ is through attachment aperture 13″ in lever section 12″ and through the crescent slot 50 in lever section 10″, as shown in FIG. 20.

Figure 15:
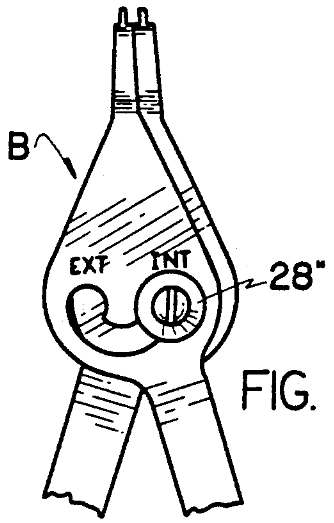
FIG. 15 is a fragmentary plan view of a third embodiment of the tool of the present invention shown in the internal-closed position.
Figure 16:
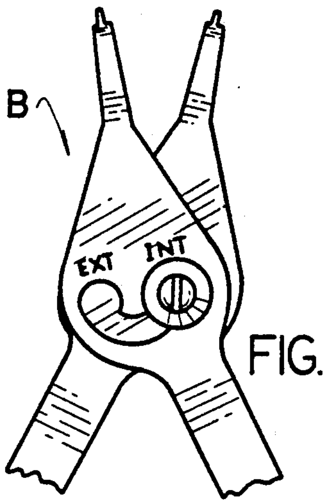
FIG. 16 is a fragmentary plan view of the third embodiment of the tool of the present invention shown in the internal-open position.

The tool B is manipulated between internal and external operating modes by movement of the lever sections 10″, 12″. As illustrated in FIG. 15, the tool is in the internal-closed position, where the lever sections 10″, 12″ are in a crossed relationship. FIG. 16 shows the tool B in the internal-open position. It should be noted that orientation of the tool in the internal operating position occurs when the lever section 10″ is moved such that the pivot pin 16″ is engaged along the stop location 52 in the boss portion 22″ of lever 10″. Orientation in the internal position also results in the tips 20" being canted toward one another.

Figure 17:
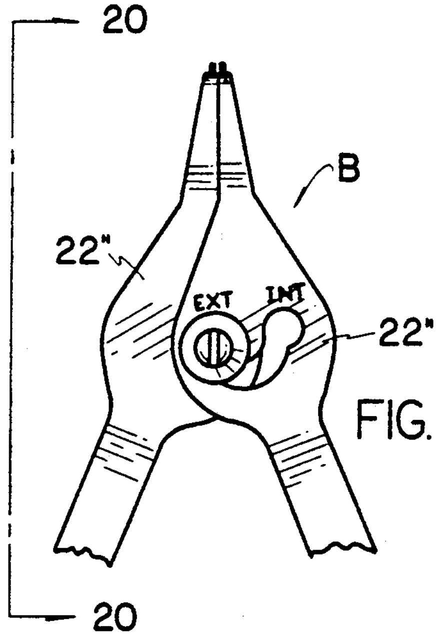
FIG. 17 is a fragmentary plan view of the third embodiment of the tool of the present invention shown in the external-closed position.
Figure 18:
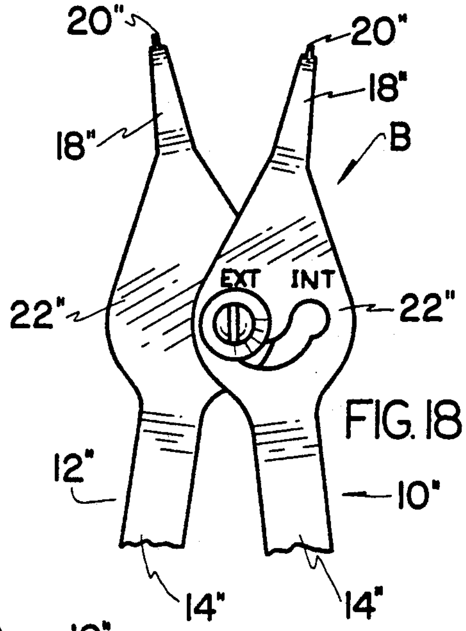
FIG. 18 is a fragmentary plan view of the third embodiment of the tool of the present invention shown in the external-open position.
Figure 19:
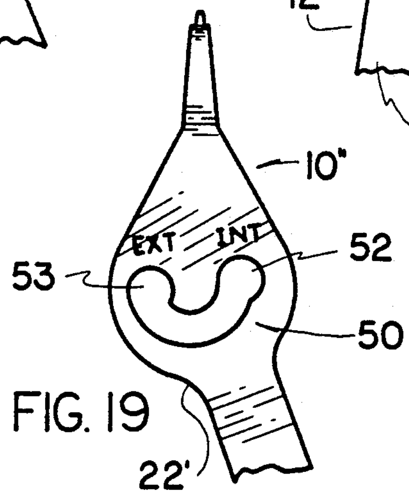
FIG. 19 is a fragmentary plan view of one lever section of the third embodiment of the plier tool of the present invention.

FIGS. 17 and 18 illustrate the tool B in the external operating position where the lever sections 10", 12" are in a side by side relationship. Movement to the external position shown is accomplished by manipulating the lever section 10" such that the pivot pin 16" is engaged with a stop location 53 also in the boss portion 22" of lever. In this external position, the tips 20" are canted away from one another in an outward direction to facilitate retentive gripping of the retaining rings. Resisting engagement of the tips 20" of the tool with the retaining ring in either the internal or external operating mode causes the pivot 16" to be forced against the stop locations 52, 53, rather than inwardly along the slot and out of the operating position.

In the embodiments shown in FIGS. 1 and 11, the tool preferably includes a biasing spring 24, 24' which urges the handles apart. The spring 24, 24' is interconnected with the handle portions of the lever sections 10, 12 and 10', 12' by spring mounts 26, 26'.

According to another feature of the invention a locking mechanism is provided for locking the handles in a closed position to inhibit their separation. As shown in FIG. 1, the mechanism includes a pivotally mounted locking lever 56 secured to the handle portion 14 of the lever section 10 by a pivot 57 projecting through a lock aperture 66 in the lock lever. The lever is pivotable between lock and unlock positions, and is generally configured to minimize tool interference disengagement from the lock position upon movement or contact with other items during storage. In the illustrated embodiment, the lever 56 includes a spring engagement surface for engaging the spring when in a locked position. The lever 56 also includes a latch portion 60 engageable with a notched portion 62 formed on the periphery of the boss portion 22 of lever section 12 as shown in FIG. 1. The lever further includes a finger engaging portion 64 which extends from the lever 56 and overlies the outside edge of the handle 14. The finger portion 64 provides for ease of manual pivoting of the lever in and out of the lock position. It should be apparent that when the handles are squeezed and the latch portion 60 is disengaged from the notch portion 62, the spring 24 pivotally biases the lever out of engagement with the lever section 12.

Referring again to FIGS. 11-14 and to FIG. 12 in particular, according to another feature of the invention, a stop limit 130, raised from one surface of the other lever section 12', is used to limit the internal ring tool handle position to a maximum open position. As shown in FIG. 12, the stop limit abuts the knob 30' to limit the opening of the spring biased handle portions 14" to a maximum open position.

The present invention thus provides an inexpensive tool for the expansion and contraction of resilient retaining members. The tool is easily switched between the internal and external operating modes by merely manipulating the shifting or driving structure 28.

The lever sections of the tool illustrated are constructed from stampings, the making of which is known by those skilled in the art. It should also be recognized that other relatively inexpensive methods of manufacture could be used to produce the disclosed tool components, such as using powdered metal technology.

From the above it will be apparent that a novel and improved hand tool has been provided. While preferred embodiments of this invention have been described in detail, it will be apparent that certain modifications or alterations can be made therein without departing from the spirit or scope of the invention set forth in the appended claims.

What is claimed is:

1. A plier tool comprising:

(a) a pair of levers each including a handle portion, a jaw portion including a tip and a boss portion fixedly interconnecting the handle and jaw portions;

(b) a pivot interconnecting the levers in a permanently intended, boss portion juxtaposed, but relatively movable and slidable relationship;

(c) the tool including a work position selection means to permit the shifting of the levers in a sliding motion as the boss portions are maintained in their juxtaposed, slidable relationship by the pivot, the motion including relative longitudinal movement such that one tip is passed by the other as the levers are moved between a first working position in a crossed relationship and a second working position in a side by side relationship and such said one tip is passed by the other as the levers are moved from the second to the first position; and, (d) the work position selection means including a position locating means for retaining the bosses in at least one of the working positions when the tool is in use, the locating means being constructed such that when the tool is used in one of the working positions reaction forces occasioned by work operation apply position retention force to the locating means and when in the other of the working positions the selection means overcomes reaction forces tending to move the levers from the working position.

2. The tool of claim 1 wherein the pivot is connected to one of the levers and the other of the levers includes a crescent shaped slot comprising at least a portion of each of the position selection and locating means.

3. The tool of claim 2 wherein the position locating means includes a detent in one end of the crescent shaped slot.

4. The tool of claim 2 wherein the connection of the pivot to the one lever is fixed.

5. A plier tool comprising:

(a) a pair of levers each including a handle portion, a jaw portion including a tip and a boss portion fixedly interconnecting the handle and jaw portions;

(b) a pivot interconnecting the levers in a permanently intended, boss portion juxtaposed, but relatively movable relationship, the pivot being connected to one of the levers;

(c) the tool including a work position selection means to permit the shifting of the levers in a sliding motion including relative longitudinal movement such that one tip is passed by the other as the levers are moved between a first working position in a crossed relationship and a second working position in a side by side relationship and such said one tip is passed by the other as the levers are moved from the second to the first position;

(d) the work position selection means including a position locating means for retaining the bosses in at least one of the working positions when the tool is in use, the locating means being constructed such that when the tool is used in at least one of the working positions reaction forces occasioned by work operation apply position retention force to the locating means; and (g) the position selection means comprising an eccentric rotatably mounted on the pivot and the other lever having surfaces complementally coactable with the eccentric.

6. The tool of claim 5 wherein the connection of the pivot to the one lever is fixed.

7. A hand tool for removing and installing internal and external retaining rings comprising:

(a) first and second unitary operating levers each including a handle portion, a jaw portion, and a boss section interconnecting said handle and jaw sections;

(b) a pivot operatively interconnecting said boss sections for relative work movement between open and closed positions;

(c) a spring operatively connected to and adaptively interposed between said first and second levers; and (d) a driving means for moving said levers between tool operating relationships for internal and external retaining rings including a movable tool rotating member, the member and one of the levers having coactable elements, one of the elements being a guide post and the other element having a surface operably engageable with the guide post for rotation limiting engagement therewith.

8. The hand tool of claim 7 wherein said tool rotating member comprises a knob having a base portion, and wherein the other element is an arcuate groove formed in the base portion for engagement with the other element and the other element is a guide post projecting from said first lever.

9. The hand tool of claim 8 wherein said knob further includes a handle portion and an engagement portion for engagement within an attachment aperture in said boss section of said one lever.

10. The hand tool of claim 7 wherein said tool rotating member comprises a knob coupled with one of levers, wherein said one element is an arcuate aperture formed in the one lever for engagement with the other element, and the other element is a driving post coupled through the knob, the other lever and the arcuate aperture.

11. A retaining ring plier selectively for use with either internal or external rings comprising:

(a) a pair of operating levers;

(b) each of said levers including a jaw portion and a handle portion and a boss portion intermediate said jaw and handle portions;

(c) a rotatable driving means including a knob having a handle portion, an engagement portion, and a base portion;

(d) said engagement portion having a channel-like groove for rotation limiting engagement with a guide means projecting from the boss portion of one of said levers;

(e) the other of the levers including a driving aperture having walls in sliding engagement with said knob engagement portion (f) said levers having a first plier operating position to provide an internal retaining ring plier wherein the levers are crossed; and (g) said one lever being pivotably connected to the engagement portion and being movable relative to said other lever upon operation of said driving means by rotation of said handle portion to move said engagement portion with respect to said driving aperture to cause movement from the first to a second plier operating position to provide an external retaining ring plier wherein the levers are in a side by side orientation.

12. The plier of claim 11 wherein said other lever has a notch in said boss section for engagement with a latch member pivotally connected to said handle section of said one lever for maintaining said plier in a closed position upon engagement of said member with a spring interposed between the levers and the adjacent latch member.

13. The plier of claim 11 wherein the groove extends at least 180°.

14. An apparatus for installing or removing internal or external retaining rings or the like comprising:

(a) first and second operating levers;

(b) said levers having jaw portions, each including a tip for engagement with retaining rings;

(c) said levers further including handle portions and boss sections between said jaw and handle portions;

(d) an actuating knob for rotating said tool between internal and external operating positions, the knob including a handle portion, a driving engagement portion, a base portion and a travel limiting portion having a channel-like groove;

(e) the boss section of one of said levers having walls defining a driving aperture for rotating engagement with said driving engagement portion;

(f) said boss section of the other of said levers being pivotably interconnected with said actuating knob and a guide means projecting from said one lever boss section for rotational guiding and stopping engagement with said groove; and (g) said other lever being movable relative to said one lever, whereby in the internal operating position said other lever jaw portion is positioned to one side of said pivotal interconnection and upon selective rotation of said knob, said guide means is rotatively guided along said groove into stopping engagement therewith, thereby locating said other lever jaw portion to the other side of said interconnection for operation in the external position.

15. A reversible snap ring tool comprising:

(a) a pair of levers each including a handle portion, a jaw portion and a boss portion fixedly interconnecting the handle and jaw portions;

(b) each of the jaw portions including a forwardly projecting ring engaging tip;

(c) a pivot normally interconnecting the levers in relatively movable and slidable, while substantially fixed axially of the pivot, relationship;

(d) the tool including a work position selection means to permit the shifting of the levers in a sliding relative motion as the boss portions are maintained in juxtaposed, slidable relationship by the pivot, the motion including relative longitudinal movement between a crossed internal ring position and a side by side external ring position;

(e) the work position selection means including a position locating means for retaining the levers in at least one of the working positions when the tool is in use, the locating means being constructed such that when the tool is used in said at least one of the working positions reaction forces occasioned by a work operation apply a position retention force to the locating means and when in the other of the working positions the selection means overcomes reaction forces tending to move the levers from the working position; and, (f) the tips being canted toward one another in a forward direction when the levers are in the internal ring position and away from one another when in the external ring position whereby to facilitate the tips retentively gripping either an internal or an external ring.

16. The tool of claim 15 wherein while the levers are normally interconnected they are nonetheless separable for repair of the tool.

17. The tool of claim 15 wherein the pivot is connected to one of the levers and the other of the levers includes a crescent shaped slot comprising at least a portion of the work position means and wherein the slot has internal and external position pivot engageable surfaces for selective engagement with the pivot to provide said locating means.

18. A reversible snap ring tool comprising:

(a) a pair of levers each including a handle portion, a jaw portion and a boss portion fixedly interconnecting the handle and jaw portions;

(b) each of the jaw portions including a forwardly projecting ring engaging tip;

(c) a pivot normally interconnecting the levers in relatively movable and slidable, while substantially fixed axially of the pivot, relationship, the pivot being connected to one of the levers;

(d) the tool including a work position selection means to permit the shifting of the levers in a sliding relative motion as the boss portions are maintained in juxtaposed, slidable relationship by the pivot, the motion including relative longitudinal movement between a crossed internal ring position and a side by side external ring position;

(e) the work position selection means including a position locating means for retaining the levers in at least one of the working positions when the tool is in use, the locating means being constructed such that when the tool is used in said at least one of the working positions reaction forces occasioned by a work operation apply a position retention force to the locating means and when in the other of the working positions the selection means overcomes reaction forces tending to move the levers from the working position;

(f) the tips being canted toward one another in a forward direction when the levers are in the internal ring position and away from one another when in the external ring position whereby to facilitate the tips retentively gripping either an internal or an external ring; and, (g) the position selection means being an eccentric rotatably mounted on the pivot and lever surfaces complemental with the eccentric.

19. A convertible snap ring plier tool comprising:

(a) a pair of levers each including jaw and handle portions interconnected by a boss portion;

(b) each of the jaw portions including a tip adapted to engage a snap ring;

(c) one of the boss portions including walls defining a circular aperture;

(d) a knob including a circular portion complementally disposed in the aperture;

(e) a pivot eccentrically interconnecting the knob and the other of the boss portions;

(f) the knob also including lever connection maintenance structure overlying at least a part of the one boss portion with the one boss portion interposed between the structure and the other boss portion to maintain the levers in an interconnected condition; and, (g) the knob being rotatable to cause relative lever movement between internal and external ring orientations wherein the tips are canted respectively toward and outward from one another in a direction away from the boss portions.

20. The plier tool of claim 19 wherein the lever connection maintenance structure comprises a circular flange axially aligned with the circular portion.

21. The plier tool of claim 19 including a relationship establishing orientation means.

22. The tool of claim 21 wherein the orientation means comprises a pin projecting from one of said levers into a groove on a selected one of said lever and knob and the internal and external relationships are respectively established by coaction of the pin and the ends of the groove.

23. The tool of claim 21 wherein the orientation means comprises said one boss portion having a selected one of a projecting pin and a groove and a selected one of the knob and said other boss portion having the remaining one of the said pin and said groove.

24. A snap ring plier tool comprising:

(a) first and second levers each including jaw and handle portions fixedly interconnected by a boss;

(b) pivot means interconnecting the bosses in juxtaposed but relatively slidable relationship;

(c) the levers having an internal ring manipulating position wherein the levers are in a crossed relationship;

(d) the levers having an external ring manipulation position wherein the levers are in a side by side relationship;

(e) the tool including position locating and guiding means for controllably permitting the levers to be shifted between the two mentioned positions while the bosses are maintained in said juxtaposed but relatively slidable relationship by said first means;

(f) the tool being constructed such that reaction forces occasioned by use of the tool when in one of the positions tend to maintain the tool in said one position and reaction forces occasioned by use of the tool when in the other of the positions tend to move the tool out of the other position;

(g) said position locating and guiding means including structure to overcome such reaction forces occasioned by use in said other position and to maintain the tool in said other position when in use; and, (h) said jaw portions including non-symmetrical tip parts whereby to permit one tip part to pass by the other as the levers are moved from a first of the positions to a second of the positions and as the levers are moved from the second position to the first.

25. A convertible snap ring plier tool comprising:

(a) a pair of unitary levers each having interconnected handle, boss and tip portions;

(b) a control knob eccentrically interconnecting the boss portions and pivotably connected to one of the boss portions;

(c) the knob and the one boss portion having interacting pin and groove means for coacting with the pivot upon rotation of the knob;

(i) in one direction to shift the levers from an internal ring position wherein the levers are crossed to an external ring position wherein the levers are side by side;

(ii) in the other direction to shift the levers from the external position to the internal position; and (d) said tip portions being configured such that on movement of the levers from one position to the other and from the other to the one position ring engagement tip parts pass by one another as the boss portions are maintained in sliding relationship.

26. The plier of claim 25 wherein a biasing means is operably connected to the boss portions to maintain them in sliding relationship.

27. The plier of claim 25 wherein the groove extends at least 180°.

* * * * *